(12) United States Patent
Hatridge et al.

(10) Patent No.: US 8,328,114 B2
(45) Date of Patent: Dec. 11, 2012

(54) DEER LURE DEVICE

(76) Inventors: Pacer Hatridge, Salem, MO (US);
Brenda Hatridge, Salem, MO (US)

(*) Notice: Subject to any disclaimer, the term of this patent is extended or adjusted under 35 U.S.C. 154(b) by 110 days.

(21) Appl. No.: 12/939,683

(22) Filed: Nov. 4, 2010

(65) Prior Publication Data

US 2012/0110888 A1 May 10, 2012

(51) Int. Cl.
*A61L 9/12* (2006.01)
*A61L 9/04* (2006.01)
*A01M 31/00* (2006.01)

(52) U.S. Cl. ............... 239/56; 239/53; 239/55; 43/1; 416/70 A; 416/71; 416/73

(58) Field of Classification Search .............. 239/6, 34, 239/36, 44, 47, 53, 55–57; 416/70 A, 71, 416/73; 43/1
See application file for complete search history.

(56) References Cited

U.S. PATENT DOCUMENTS

| 435,197 | A | * | 8/1890 | Wickliffe | 416/71 |
| 5,407,642 | A | * | 4/1995 | Lord | 422/122 |
| 6,857,579 | B2 | * | 2/2005 | Harris | 239/56 |
| 2005/0199740 | A1 | * | 9/2005 | Harris, Jr. | 239/34 |
| 2008/0011871 | A1 | * | 1/2008 | Sexton | 239/55 |

* cited by examiner

*Primary Examiner* — Darren W Gorman
(74) *Attorney, Agent, or Firm* — Jerry D. Haynes; Law Office of Jerry D. Haynes

(57) ABSTRACT

A scent container for the dispersing of animal scent comprising: a top portion; a bottom portion, where said bottom portion and the top portion are flexibly connected; an absorbent sponge contained in both the top portion and the bottom portion, where the absorbent sponge includes an animal scent; and a clamping portion, where the container attaches to the clamping portion. The clamping portion may include a handle and gripping teeth. The top portion and bottom portion may be interchangeable between a closed position and an open position. The container enables the disbursement of the animal scent when in the open position.

4 Claims, 1 Drawing Sheet

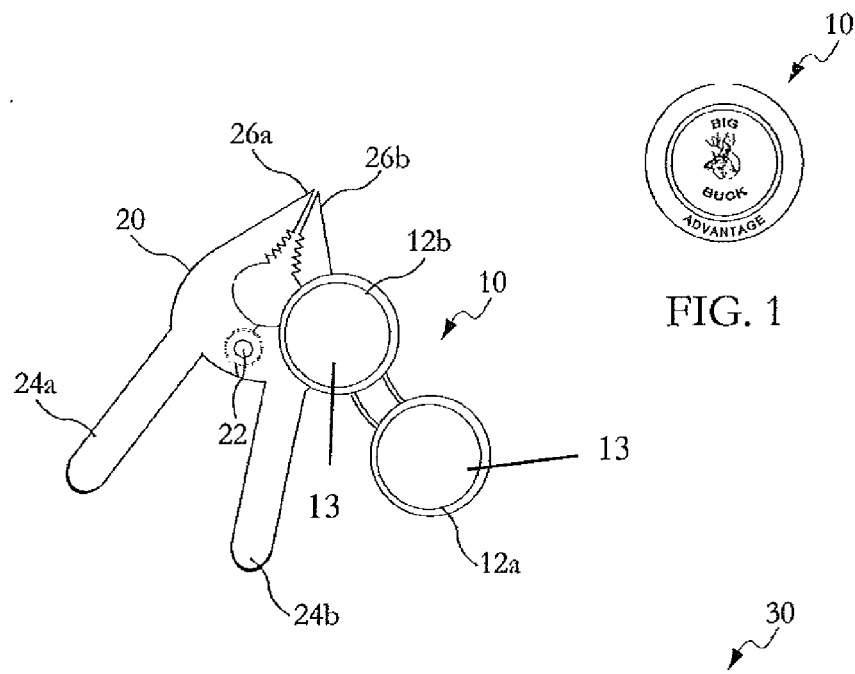

DEER LURE DEVICE

BACKGROUND OF THE INVENTION

1. Field of Invention

The present invention relates to a deer lure device that is clampable and reusable as means to attract deer while using a deer scent.

2. Description of Related Art

Hunting is a recreational sport enjoyed by many individuals. Most recreational hunters practice hunting during the hunting season designated by their particular state. Hunting involves the tracking, stalking and killing of animals for sport and/or food. Hunters pursue various types of game such as a small game such as squirrels, rabbits or other small varmints. Some hunters pursue fowl and other hunters pursue larger game such as deer, moose or bears to name a few.

In relation to deer hunting, one particular technique used to assist the deer hunter is the application of deer scent to attract bucks to a particular area. Most deer scent currently used comes in the form of a liquid and the hunter must spread the deer scent into a particular area in order to attract the deer. The deer scent comes in all varieties and may be in the form of urine, estrous, or tarsal gland. The scents are principally applied through the use of liquids and placed at particular points in the woods to attract the deer. The liquid is applied through the use of bottles, gels and in certain instances sprays. Also many deer hunters use dispensers that are actually dragged through the woods as a means to dispense the liquid in a particular area.

One drawback to using the scenting products of the prior art is that the liquid products and gels may become wasteful and impractical due to the frequent reapplications that must be executed by the hunter when using them. It would therefore be advantageous to have a device that could contain the desired scent and be placed in a stationary position for retrieval by the hunter upon completion of the hunting expedition.

SUMMARY OF THE INVENTION

The present invention relates to a scent container for the dispersing of animal scent comprising: a top portion; a bottom portion, where said bottom portion and the top portion are flexibly connected; an absorbent sponge contained in both the top portion and the bottom portion, where the absorbent sponge includes an animal scent; and a clamping portion, where said clamping portion, where the container attaches to the clamping portion. The clamping portion may include a handle and gripping teeth. The top portion and bottom portion may be interchangeable between a closed position and an open position. The container enables the dispersing of the animal scent when in the open position.

BRIEF DESCRIPTION OF DRAWINGS

FIG. 1 depicts a scent container according to the present invention.

FIG. 2 depicts the use of the scent container in conjunction with a clamp as contemplated by the present invention.

FIG. 3 depicts an alternative use of a scent container used with an accordion fan.

DETAILED DESCRIPTION

The present invention relates to a lure container that provides a means to disperse scent in order to lure a deer or buck. As commonly practiced in deer hunting deer scents and lures are used to attract deer however many of these lures and scents are in liquid form and therefore require repetitive applications. The present invention provides a container that includes absorbent sponges that absorb deer scent for disbursement in the woods. The container is used in conjunction with a clamping device and provides a means to clamp the open container onto a branch, tree limb or other stationary object in the woods to provide a scented lure for a deer. The lure according to the present invention is contained within the container with the use of the absorbent sponges and therefore may be applied in various applications to disperse scent and therefore attract a deer or buck.

FIG. 1 depicts a lure scent container 10 according to the present invention. The container 10 is depicted in an open position in FIG. 2. The container 10 includes a top portion 12a and a bottom portion 12b. The top portion 12a and bottom portion 12b may be connected and create two containers and sponges 13 may be inserted in each of the top portion 12a and the bottom portion 12b. The absorbent sponges 13 are filled with the lure or scent and therefor emit a scent to attract deer or other game. The container 10 attaches to a clamp 20 which includes handles 24a, 24b. A spring bolt 22 is provided on the clamp 20 and a user may open the clamp 20 by using the handles 24a, 24b. When in an open position, gripping teeth 26a, 26b may be clamped onto a tree branch or other stationary device in the woods. Once the clamp 20 is in place, the container 10 is opened and the scent is allowed to disperse so that it may attract any deer or buck to the desired area.

As can be seen, the lure container 10 is unique in that a hunter does not have to spread or disperse liquid throughout the woods and may instead use multiple containers clamped in a particular area to allow for the disbursement of the deer scent. Once the hunter is complete with their hunting expedition, the containers according to the present invention may be retrieved and placed in a closed position for reuse at a later time.

The container 10 may also be used in an alternative application as shown in FIG. 3. FIG. 3 depicts an accordion hand fan 30. The fan 30 includes a container 32 that includes a scented sponge as used in container 10. The fan 30 opens up to allow the disbursement of scent in the container 32 and rotates into an open position at the center point 34. The opposite end of the fan 30 includes a lid 35 that places the fan in a closed position when the container 32 is not in use. Therefore the sponge scent is within the container 32 and the container 32 allows the hunter to use the hand fan 30 to disperse the scent over a particular area when using the container 32.

The present invention therefore uses a stationary sponge deer scent within a container to lure a deer or a buck. Use of this device is far more advantageous than using the gels and liquids that are currently in use. Because the scent is contained within a container it can be reused until its scenting attributes have dissipated. The scent container releases a strong scent with a large broadcast range and allows the hunter to retrieve the scent containers upon completion of the hunting expedition. This scent container device is also portable, compact and allows the hunter to have a greater range of application and optimum accessibility. The instant invention has been shown and described in what it considers to be the most practical and preferred embodiments. It is recognized, however, that departures may be made there from within the scope of the invention and that obvious modifications will occur to a person skilled in the art.

What is claimed is:

1. A lure device for the dispersing of animal scent comprising:
   a. a container, where the container includes
      i. a top portion;
      ii. a bottom portion, where said bottom potion and the top portion are flexibly connected;
      iii. an absorbent sponge contained in both the top portion and the bottom portion, where the absorbent sponge includes an animal scent; and
      iv. an accordion fan expanding between the top portion and bottom portion; and
   b. a clamping portion, where the container attaches to said clamping portion.

2. The lure device according to claim 1, where the clamping portion includes a handle and gripping teeth.

3. The lure device according to claim 1, where the container is interchangeable between a closed position and an open position.

4. The lure device according to claim 3, where the container enables the dispersing of the animal scent when in the open position.

* * * * *